G. Merritt,
Pencil.

No. 2595. Reissued. May 7. 1867.

Witnesses.
W. C. Day.
Frank. A. Hadicke

Signature
George Merritt

United States Patent Office.

GEORGE MERRITT, OF NEW YORK, N. Y.

*Letters Patent No.* 62,555, *dated March* 5, 1867; *reissue No.* 2,595, *dated May* 7, 1867.

PENCIL-POINT PROTECTOR.

The Schedule referred to in these Letters Patent and making part of the same.

TO ALL WHOM IT MAY CONCERN:

Be it known that I, GEORGE MERRITT, of the city and county of New York, in the State of New York, did invent a new and useful Pencil-Point Protector, for which invention Letters Patent of the United States were issued to me on the 5th day of March, 1867, and numbered 62,555, and that having been advised by counsel learned in the law that said Letters Patent are inoperative and invalid by reason of a defective specification, I have applied to the Commissioner of Patents to issue to me new Letters Patent for said invention under an amended specification; and I do hereby declare that the following is a full and exact description thereof.

My invention is adapted to fit upon the end of a common lead pencil, and to protect the point from injury. I combine with the hard casing, which forms the body of the protector proper, a rubber covering adapted to serve for erasing lines; and the whole may be produced cheaply, and is adapted to serve in a very convenient and efficient manner. When the pencil is in use the protector may be fitted, as is usual with other protectors, upon the opposite end of the lead pencil. I will first describe what I consider the best means of carrying out my invention, and will afterwards designate the points which I believe to be new. The accompanying drawings form a part of this specification.

Similar letters of reference indicate like parts in all the figures.

Figure 1:
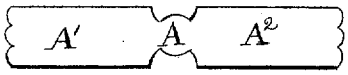
Figure 1 shows the form in which the sheet brass or other metal is first cut from a broad sheet of metal.
Figure 2:
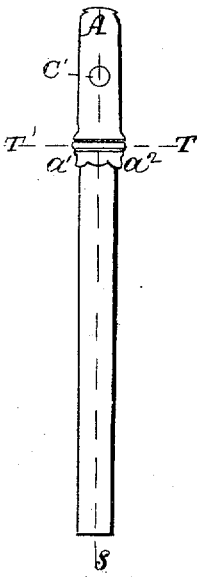
Figure 2 is a side elevation of the protector after it has been bent into the complete form and encircled by the spring.
Figure 4:
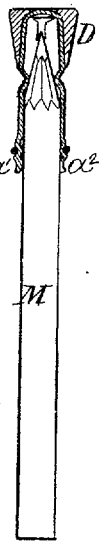
Figure 4 is a longitudinal section on the line S S in fig. 2.
Figure 3:
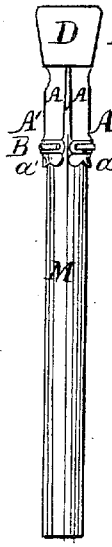
Figure 3 represents the same after the rubber eraser has been added. This view is taken at right angles to that in fig. 2.
Figure 5:
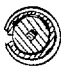
Figure 5 is a cross-section on the line T T in fig. 2.

A is a central, swelled end, which applies opposite to the point of the lead pencil M. $A^1$ and $A^2$ are extensions therefrom, which are struck, by dies or otherwise, into the form of arms or wings extending parallel to each other, as represented. The part A $A^1$ $A^2$ is formed from one piece of hard brass. The form in which the piece is first cut is indicated in fig. 1. The form which it finally assumes after having been shaped by the dies is indicated in fig. 2. B is a nearly complete ring of hard brass wire or other elastic metal. It is applied upon the protector in the manner represented, and is received between two swells or beads struck up, as represented on the parts $A^1$ $A^2$. This partial band B tends to hold the extremities of the wings $A^1$ $A^2$ close together, but will yield by its elasticity and allow them to open to receive a large pencil, or to close and fit with tolerable tightness upon a pencil which is a little smaller than the average. The wood of lead pencils is usually so uniform in diameter that it is practicable to make one of my pencil-point protectors fit on all ordinary pencils. $C^1$ $C^2$ are deep indentations produced by dies. At these points the metal of the wings $A^1$ $A^2$ is forced in and considerably beyond the general interior surface of the protector. These indentations form stops or shoulders, against which the conical or deeper portion of the pencil, supposed to be pointed in the ordinary manner, is rested when it is forced into the protector. D is a rubber piece made in an annular form, but somewhat smaller than the interior of the metal portion A $A^1$ $A^2$. In being forced on it is extended, and retains its place by embracing tightly the exterior of the metal portion. Its hold upon the metal portion may be increased, if desired, by forming a number of indentations and projections on the exterior of the portions $A^1$ $A^2$, but I do not consider it usually necessary. Its exterior periphery may be deeper, as represented, and formed in a square or other desired figure near the end. The elasticity of this rubber tends to hold the wings $A^1$ $A^2$ together. It may serve with some success as a substitute for the partial ring B, but I prefer to use both. The extreme ends of the wings $A^1$ $A^2$ are scalloped and flared outward, as indicated at $a^1$ $a^2$. The scalloped form allows the edge of the metal to be flared with facility, and the flaring form allows it to receive the tapering portion of a large pencil without arresting its motion or abrading the surface. But the motion of the pencil inward into the protector is always arrested on striking the stops $C^1$ $C^2$, and these stops are at a sufficient distance from the end A to preserve the point of the pencil, when pointed in the ordinary manner, from contact with any of the surfaces. There are many modifications of form which may be applied to my protector. Thus, for example, the indentations $C^1$ $C^2$ may be made more sharp and efficient by partially cutting the metal at or near these points, and bending inward the cut portion; or again, a complete groove may be struck quite around the entire protector; or only one of the stops, $C^1$ for example, may be used instead of two; or again, the entire outer end of the metallic portion of the protector—by which I mean what was originally the central portion A—and the adjusting ends of the wings $A^1$ $A^2$ may be made of less diameter, when the article is finished, than the portion around which the spring B is applied. I propose to make the swelled end A serve as a seal when desired, and to stamp, or otherwise produce on it, a star or other convenient device, in order to use the seal upon thin wax. The rubber portion D may be slipped down from the end, or may be removed altogether. It is not essential that the spring B be made of a partial ring of wire; it may be made of a complete ring of India rubber, or any other substances, if desired. My protector may be used without the erasive head D, and still afford a portion of the advantages due to my invention. The rounded form of the end A allows the protector to be more easily inserted in the erasive head and, in case it be used without the said head, makes it more smooth and more convenient for carriage in the pocket.

Having now fully described my invention, what I claim as new in pencil-point protectors, and desire to secure by Letters Patent, is as follows:

1. I claim a pencil-point protector, made with two or more wings $A^1$ $A^2$, adapted to fit on the enclosed pencil M, substantially as herein specified.

2. I claim the metal piece A $A^1$ $A^2$, and the spring B, adapted to operate together upon the end of an ordinary wood pencil, substantially as and for the purpose herein specified.

3. I claim the combination of a rubber eraser, D, with the metallic portion, so as to give the proper erasive property to the exterior, and also to contribute by its contractile force to the clasping of the metallic portion upon the wood of the contained pencil, substantially as herein specified.

4. I claim the scalloped and flaring mouth $a^1$ $a^2$ on the metallic pencil-point protector, substantially as herein specified.

In testimony whereof I hereunto set my hand in presence of two subscribing witnesses.

GEORGE MERRITT.

Witnesses:

W. F. BARDEN,

FRANK A. HADICKE.